M. J. ANDERSON.
WEED DESTROYER.
APPLICATION FILED JULY 24, 1918.
1,296,153.
Patented Mar. 4, 1919.
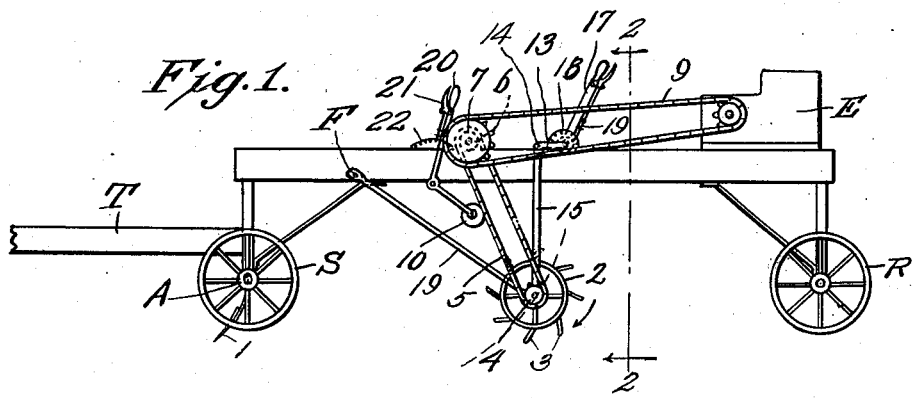
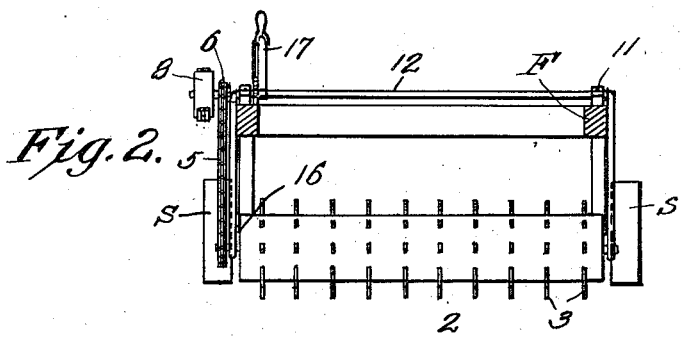
Witnesses
James F. Crown
N. L. Collamer
Inventor
Martin J. Anderson,
By Richard B. Owen,
Attorney

UNITED STATES PATENT OFFICE.

MARTIN J. ANDERSON, OF WARREN, MINNESOTA.

WEED-DESTROYER.

1,296,153.               Specification of Letters Patent.      Patented Mar. 4, 1919.

Application filed July 24, 1918. Serial No. 246,538.

*To all whom it may concern:*

Be it known that I, MARTIN J. ANDERSON, a citizen of the United States, residing at Warren, in the county of Marshall and State of Minnesota, have invented certain new and useful Improvements in Weed - Destroyers, of which the following is a specification.

This invention relates to harrows and diggers, and more especially to stalk choppers; and the object of the same is to produce a weed destroyer which includes a series of shovels or cultivator teeth to be dragged through the ground, and in rear of them a reversely rotating drum having knives, fingers, or teeth, to break up and destroy the stalks and roots of the weeds which are dug by the shovels.

Another object is to produce a machine of this kind wherein the motive power is a small engine carried on the framework.

Another object is to provide means for adjusting the height of the chopping drum, and for raising it entirely off the ground when the machine is to be transported from place to place.

Details are set forth below, and attention is invited to the drawings wherein:—

Figure 1 is a side elevation of this machine complete,

Fig. 2 is a cross section on the line 2—2 of Fig. 1.

A framework F is mounted on rear wheels R and on a front axle A carrying the front or steering wheels S, and the draft is herein indicated as a team to be hitched to the front axle and to steer the same by swinging the tongue T from side to side. The letter E designates a small gasolene engine mounted on the framework. No novelty is claimed for the parts thus far mentioned.

Carried by and beneath the front axle and supported therefrom in any suitable manner is a row of shovels or cultivator teeth indicated by the numeral 1. These may be of any appropriate size and shape, and extend the full width of the distance between the front wheels S. They are intended to agitate the earth as the machine passes over the same, and they dig into it sufficiently to loosen the weeds and to break up clods as will be understood. I do not wish to be limited as to the number, shape, disposition, or manner of mounting these shovels; but I prefer to use them in conjunction with the chopping mechanism next to be described.

In rear of the shovels and perhaps about midway between the front and rear wheels, is disposed a horizontal drum 2 carrying on its periphery a series of teeth 3 extending the full length of the drum which, in turn, is about as long as the row of shovels; and the purpose of these teeth is to co-act with the shovels in chopping or breaking up the weeds, both their tops and their roots, which have been dug by the shovels or teeth. I do not wish to be limited as to the shape, number, and disposition of the teeth 3 on the drum, and the latter rotates in the direction indicated by the arrow in Fig. 1.

For bringing about this motion, a sprocket 4 on one end of the shaft of the drum is connected by a chain belt 5 with a sprocket 6 which is fast on a countershaft 7 extending across and overlying the frame F. One end of this shaft carries another sprocket 8, preferably larger than that first mentioned, and this sprocket is connected by a chain belt 9 with the engine E. Now when the latter is started, motion is transmitted through this mechanism to the drum, and the latter is rotated in a manner which will be clear, its speed and direction of rotation depending upon the belting and the size of the sprockets. A belt tightener is indicated at 10, its details being unimportant, but its function being to tighten the belt 5 when necessary by a movement substantially transverse to the length of the chain belt 9.

Mounted in bearings 11 on the framework F is a cross shaft 12 having cranks 13 at its extremities, and to each crank at 14 is pivoted a link 15 which hangs therefrom and is connected at its lower end with the box 16 in which the shaft of the drum is mounted. A hand lever 17 fast on the shaft 12 moves alongside a toothed sector 18 which is engaged by a thumb latch 19, and when this lever is adjusted the shaft 12 is oscillated within its bearings and its arms or cranks 13 raise or lower the links and therefore adjust the position of the drum vertically. Braces 19 connected to the boxes 16 are pivoted to the framework F forward of the drum and countershaft, and therefore the former when it is adjusted vertically must rise through an arc as indicated by the dotted line in Fig. 1. It is quite possible that when the drum is raised completely off the ground, its belt 5 may move out of contact with the belt tightener 10, but at this time the latter is not necessary. On the other hand, when the lever is moved to press the drum downward so that its teeth enter the earth, the belt 5 grows tighter and tighter and the tightener 10 becomes eventually unnecessary. For intermediate positions this tightener may be adjusted by a hand lever 20 having a thumb latch 21 moving over a toothed sector 22 if desired, although its adjustment will not often be necessary.

In operation, this machine is drawn to the point of use and the shovels and drum let down as far as may be necessary. Now the team or other draft is started forward, and the shovels 1 tear up the earth and dig up the weeds. Immediately they are followed by the drum rapidly rotating in a reverse direction as indicated by the arrow in Fig. 1, and its teeth 3 chop the stalks and roots of the weeds and destroy them, leaving the pieces strewn on the ground where they die and become fertilizer. Also the teeth 3 will break up any clods or lumps which pass between the shovels 1, and leave the soil in a comminuted condition, ready for planting. I may even employ this machine on a field which has been cleared of weeds and perhaps harrowed roughly, and one passage of it over the same will put the earth in excellent condition for planting.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

In a machine of the class described, the combination with a framework mounted on wheels, a driving mechanism thereon, and a counter-shaft driven by said mechanism and having a sprocket wheel on one extremity; of a toothed drum extending transversely beneath the framework and having a sprocket wheel on one end of its shaft, a belt connecting said sprocket wheels and leading obliquely from the drum sprocket upward to the sprocket on the counter shaft, braces pivotally connecting the frame with bearings in which the drum-shaft is mounted and leading from said bearings obliquely forward and upward to points on the frame forward of said counter shaft, a hand-lever pivoted to the frame and having a handle at its upper end and a cranked lower portion, and a belt tightening pulley carried by said lower portion in position to be swung against one stretch of said sprocket chain, this pulley moving through an arc having a shorter radius than the drum shaft when adjusted vertically.

In testimony whereof I affix my signature in presence of two witnesses.

MARTIN J. ANDERSON.

Witnesses:
 R. E. Thomas,
 C. F. Pihlstrom.